(12) United States Patent
Li et al.

(10) Patent No.: US 8,539,760 B2
(45) Date of Patent: Sep. 24, 2013

(54) CATALYST MATERIALS FOR $NO_x$ OXIDATION IN AN EXHAUST AFTERTREATMENT SYSTEM THAT USES PASSIVE AMMONIA SCR

(75) Inventors: Wei Li, Troy, MI (US); Chang H Kim, Rochester, MI (US); Kevin L. Perry, Fraser, MI (US); Paul M. Najt, Bloomfield Hills, MI (US); Kushal Narayanaswamy, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 266 days.

(21) Appl. No.: 12/881,233

(22) Filed: Sep. 14, 2010

(65) Prior Publication Data

US 2012/0060472 A1    Mar. 15, 2012

(51) Int. Cl.
*F01N 3/00* (2006.01)
(52) U.S. Cl.
USPC .......... 60/301; 60/274; 60/297; 60/299; 423/213.2; 423/239.1; 423/239.2; 422/171; 422/177
(58) Field of Classification Search
USPC ........ 60/274, 285, 297, 299, 301; 423/213.2, 423/213.5, 239.1, 239.2; 422/169, 171, 177
See application file for complete search history.

(56) References Cited

U.S. PATENT DOCUMENTS

| | | | | |
|---|---|---|---|---|
| 5,879,645 A * | 3/1999 | Park et al. | | 423/213.2 |
| 6,536,210 B1 * | 3/2003 | Komoriya et al. | | 60/301 |
| 6,725,647 B2 * | 4/2004 | Pfeifer et al. | | 60/274 |
| 6,919,047 B1 * | 7/2005 | He et al. | | 422/122 |
| 7,407,911 B2 * | 8/2008 | Yeo | | 502/304 |
| 7,490,464 B2 * | 2/2009 | Li et al. | | 60/295 |
| 7,794,815 B2 * | 9/2010 | Ohno et al. | | 428/116 |
| 8,037,674 B2 * | 10/2011 | Kupe et al. | | 60/286 |

FOREIGN PATENT DOCUMENTS

| | | |
|---|---|---|
| DE | 10104160 A1 | 8/2002 |
| DE | 69916276 T2 | 4/2005 |
| DE | 102009043210 A1 | 7/2010 |

OTHER PUBLICATIONS

German Office Action dated Apr. 26, 2013; Applicant: GM Global Technology Operations LLC; Application No. 102011112175.0; 6 pages.

* cited by examiner

*Primary Examiner* — Binh Q Tran
(74) *Attorney, Agent, or Firm* — BrooksGroup

(57) ABSTRACT

An exhaust aftertreatment system that receives an exhaust flow from a lean-burn engine and a method for treating the exhaust flow are described. The exhaust aftertreatment system may include a three-way-catalyst, an oxidation catalyst, and a $NH_3$—SCR catalyst. The three-way-catalyst passively generates $NH_3$ from native $NO_x$ contained in the exhaust flow when an A/F mixture supplied to the engine is cycled from lean to rich. The generated $NH_3$ is then stored in the $NH_3$—SCR catalyst to facilitate $NO_x$ reduction when the A/F mixture supplied to the engine is cycled back to lean. The oxidation catalyst is located upstream of the $NH_3$—SCR catalyst and operates to lower the NO to $NO_2$ molar ratio of the $NO_x$ fed to the $NH_3$—SCR catalyst. The oxidation catalyst comprises perovskite oxide particles.

25 Claims, 2 Drawing Sheets

CATALYST MATERIALS FOR $NO_x$ OXIDATION IN AN EXHAUST AFTERTREATMENT SYSTEM THAT USES PASSIVE AMMONIA SCR

TECHNICAL FIELD

The technical field relates generally to exhaust aftertreatment systems that treat the exhaust produced by a lean-burn engine and, more particularly, to catalyst materials that may be used to oxidize NO to $NO_2$ upstream of an ammonia-selective catalytic reduction ($NH_3$—SCR) catalyst that uses passively generated $NH_3$ to reduce $NO_X$ to $N_2$.

BACKGROUND

Lean-burn spark-ignition engines are primarily supplied with, and combust, a lean mixture of air and fuel (oxygen-rich mixture) to achieve more efficient fuel economy. The exhaust emitted from such engines during periods of lean-burn operation may include a relatively high content of nitrogen ($N_2$) and oxygen ($O_2$), a relatively low content of carbon monoxide (CO) and unburned/partially-burned hydrocarbons (HC's), and small amounts of nitrogen oxides primarily comprised of NO and $NO_2$ (collectively referred to as $NO_X$). The $NO_X$ constituency of the exhaust may fluctuate between about 50 and 1500 ppm and generally comprises far greater amounts of NO than $NO_2$ along with nominal amounts of $N_2O$. The hot engine exhaust, which can reach temperatures of up to about 900° C., often needs to be treated before it can be released to the atmosphere.

An exhaust aftertreatment system may be associated with the lean-burn engine to help remove unwanted gaseous emissions that may be present in the lean-burn engine exhaust. The exhaust aftertreatment system may be configured to receive an exhaust flow from the lean-burn engine and generally aspires to cooperatively (1) oxidize CO into carbon dioxide ($CO_2$), (2) oxidize HC's into $CO_2$ and water ($H_2O$), and (3) convert $NO_X$ gases into $N_2$ and $O_2$. The reduction of $NO_X$ to $N_2$ is generally the most difficult exhaust reaction to facilitate since the hot, oxygen-abundant, and low reductant content nature of lean-burn engine exhaust renders the kinetics for that reaction quite unfavorable. A variety of exhaust aftertreatment system architectures that employ specially-catalyzed components can nonetheless sufficiently facilitate the removal of CO, HC's, and $NO_X$ so that the exhaust expelled to the environment contains a much more desirable chemical makeup.

A $NH_3$—SCR catalyst, for example, may be included in the exhaust aftertreatment system to help reduce $NO_X$ to $N_2$. The $NH_3$—SCR catalyst may be washcoated onto a support substrate and located in the flow path of the exhaust. Ammonia may be introduced into and mixed with the exhaust emanated from the lean-burn engine upstream from the $NH_3$—SCR catalyst. One way to introduce $NH_3$ into the lean-burn engine exhaust is to periodically combust a stoichiometric or rich mixture of air and fuel in the lean-burn engine and to pass the resulting rich-burn engine exhaust through a catalytic converter that comprises a three-way-catalyst to passively generate $NH_3$ from native $NO_X$ and $H_2$. The $NH_3$ is then absorbed by the $NH_3$—SCR catalyst where it becomes available to selectively reduce $NO_X$ contained in the engine exhaust to $N_2$ in the presence of $O_2$. Unreacted or excess $NH_3$ may remain absorbed by the $NH_3$—SCR catalyst for consumption at a later time. The passive generation of $NH_3$ from native $NO_X$ can, in some instances, obviate the need to store $NH_3$ or urea in an on-board storage tank that requires monitoring, regular refilling, and the active dosing of $NH_3$ or urea into the exhaust through an injector device.

The molar ratio of NO to $NO_2$ in the exhaust fed to the $NH_3$—SCR catalyst may affect low-temperature $NO_X$ conversion. Many $NH_3$—SCR catalysts convert $NO_X$ to $N_2$ more efficiently when the molar ratio of NO to $NO_2$ is significantly lower than that produced by the lean-burn engine. A lower NO to $NO_2$ molar feed ratio may be achieved by positioning an oxidation catalyst that oxidizes NO to $NO_2$ upstream of the $NH_3$—SCR catalyst. Conventional oxidation catalysts such as a diesel oxidation catalyst or a two-way catalyst generally comprise a combination of platinum group metals (PGM's). But the PGM's used to prepare the oxidation catalyst material—most notably platinum and palladium—are quite expensive. Several of the PGM's used have also been shown, in some instances, to exhibit poor thermal durability and to lose some catalytic activity when exposed to high-temperature engine exhaust.

The use of a $NH_3$—SCR catalyst in the exhaust aftertreatment system for a lean-burn engine is an attractive, yet challenging, option for removing $NO_X$ from the engine's exhaust. Such a device is often paired with an upstream oxidation catalyst to boost $NO_X$ conversion at low-temperatures. Conventional oxidation catalysts, however, primarily contain expensive and insufficiently durable PGM's. Exhaust aftertreatment and $NH_3$—SCR technology related to $NO_X$ removal are thus constantly in need of innovative developments that can help advance to this and other related fields of technological art.

SUMMARY OF EXEMPLARY EMBODIMENTS

An exhaust aftertreatment system that receives an exhaust flow from a lean-burn engine that is combusting an A/F mixture may include a three-way-catalyst, an oxidation catalyst, and a $NH_3$—SCR catalyst. The three-way-catalyst passively generates $NH_3$ from native $NO_X$ and $H_2$ contained in the exhaust flow when the A/F mixture is cycled from lean to rich. The generated $NH_3$ is absorbed by the $NH_3$—SCR catalyst. The absorbed $NH_3$ is then consumed to reduce $NO_X$ to $N_2$ when the A/F mixture combusted in the engine is cycled back to lean. The oxidation catalyst, which may be located upstream of the $NH_3$—SCR catalyst, comprises perovskite oxide particles and operates to lower the NO to $NO_2$ molar ratio of the $NO_X$ fed to the $NH_3$—SCR catalyst to enhance low-temperature $NO_X$ conversion efficiency. Other exemplary and more detailed embodiments of the invention will become apparent from the detailed description that follows.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description is merely exemplary in nature and is in no way intended to limit the claimed invention(s), its application, or its uses.

An exhaust aftertreatment system that passively generates $NH_3$ may include an oxidation catalyst located upstream of a $NH_3$—SCR catalyst to lower the molar ratio of NO to $NO_2$ contained in the exhaust produced by a lean-burn engine. The oxidation catalyst may comprise perovskite oxide particles optionally dispersed on a base material. The inclusion of PGM's in the oxidation catalyst, although not prohibited, is not needed to achieve satisfactory NO oxidation over a robust temperature range. The opportunity to reduce the amount of PGM's used in an exhaust aftertreatment system can contribute to significant cost savings and help counteract the thermal durability issues sometimes associated with PGM's.

Figure 1:
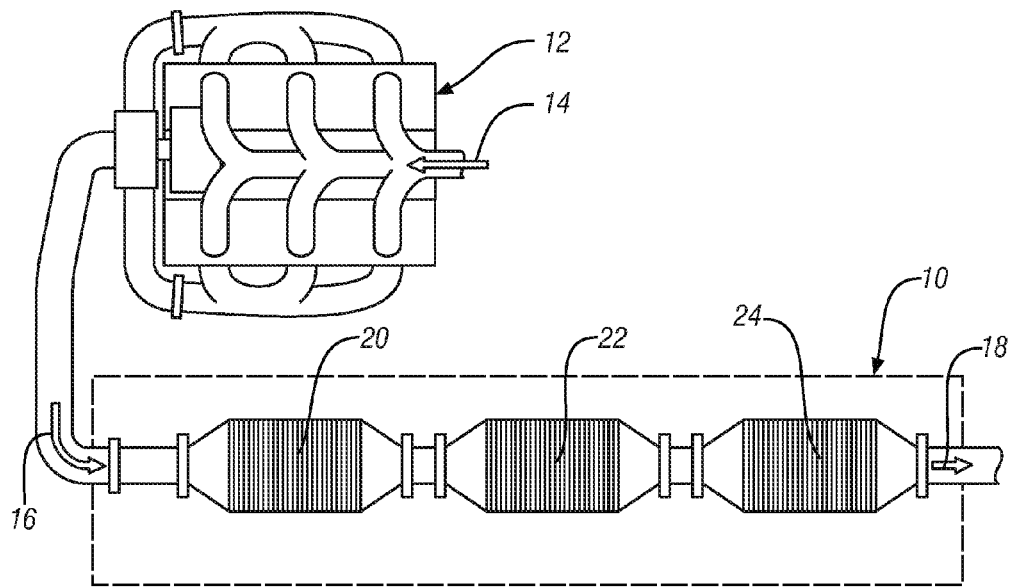
FIG. 1 is a generalized and schematic depiction of an exhaust aftertreatment system for a lean-burn engine that includes a three-way-catalyst, an oxidation catalyst, and a $NH_3$—SCR catalyst.

FIG. 1 depicts a generalized and schematic illustration of an exhaust aftertreatment system 10 for treating the exhaust produced by a lean-burn spark-ignition engine 12 (hereafter "engine") that combusts an air/fuel (A/F) mixture 14. The exhaust aftertreatment system 10 receives an exhaust flow 16 from the engine 12 and communicates a treated exhaust flow 18 downstream for expulsion to the atmosphere. The exhaust aftertreatment system 10, as illustrated here, may include a three-way-catalyst 20, an oxidation catalyst 22, and a $NH_3$—SCR catalyst 24. The three-way-catalyst 20, the oxidation catalyst 22, and the $NH_3$—SCR catalyst 24 work cooperatively to decrease to acceptable levels the amount of unwanted gaseous emissions contained in the exhaust flow 16. The three-way-catalyst 20 passively generates $NH_3$ for absorption by the $NH_3$—SCR catalyst 24 when the A/F mixture 14 is cycled from lean to rich. The oxidation catalyst 22 oxidizes NO when the A/F mixture 14 is lean so that the $NO/NO_2$ molar ratio of the $NO_X$ fed to the $NH_3$—SCR catalyst 24 is lowered to a more desirable figure from that originally produced by the engine 12. The $NH_3$—SCR catalyst 24 reduces $NO_X$ (both NO and $NO_2$) to $N_2$ when the absorbed $NH_3$ reacts with $NO_X$ in the presence of $O_2$. Other catalysts, components, and/or structural features may also be present in the exhaust aftertreatment system 10 as understood by skilled artisans.

The engine 12 may be any spark-ignition engine that is constructed and designed to receive and combust the A/F mixture 14 to generate mechanical energy. Specific examples of spark-ignition engines that may be employed include a spark-ignition direct injection (SIDI) engine and a homogeneous charge compression ignition (HCCI) engine. The general construction and operating requirements of these types of engines are well known to skilled artisans and, as such, need not be described in further detail here.

The A/F mixture 14 supplied to the engine 12 may be lean of stoichiometry (lean) most of the time. But occasional cycling of the A/F mixture 14 between lean and rich may be initiated to produce $NH_3$ for the $NH_3$—SCR catalyst 24, as described in more detail below. The A/F mixture 14 is generally considered lean when a greater-than-stoichiometric amount of air is available to combust the fuel. The air to fuel mass ratio of the A/F mixture 14, when lean, may range from about 20 to about 65 depending on the engine load and RPM. The A/F mixture 14 is generally considered rich when a stoichiometric amount of air or less is available to combust the fuel. The air to fuel mass ratio of the A/F mixture 14, when rich, may range from about 12-15 depending on the engine load and RPM. Any of a variety of known mechanical and electrical control systems may be coupled to the engine 12 or its surrounding auxiliary components to dynamically control the mass ratio of air to fuel in the A/F mixture 14.

The engine 12 combusts the A/F mixture 14 and produces the exhaust flow 16 that is supplied to the exhaust aftertreatment system 10. The general chemical composition of the exhaust flow 16 and its specific variances are well understood by skilled artisans. The exhaust flow 16, more specifically, typically includes a large amount of $N_2$ (greater than 70% by weight), possibly some $O_2$, and unwanted gaseous emissions comprised of the following: CO, HC's, and a $NO_X$ contingent primarily comprised of NO and $NO_2$. The chemical composition and temperature of the exhaust flow 16 may vary depending on a number of factors including, but not limited to, the distance between the engine 12 and the exhaust aftertreatment system 10, the presence of any intervening components such as a turbocharger turbine and/or an EGR bleed line, the engine load and RPM, and the air to fuel mass ratio of the A/F mixture 14.

When the A/F mixture 14 is lean, for instance, which is most of the time, the amount of CO and HC's present in the exhaust flow 16 is quite low and an appreciable amount of $O_2$ is present since complete or near complete combustion of the fuel occurs in the presence of excess air. The $NO_X$ contingent of the exhaust flow 16 may fluctuate between about 50 and about 1500 ppm. The proportion of NO and $NO_2$ particles in the $NO_X$ contingent usually ranges from approximately 80%-95% NO and approximately 5%-20% $NO_2$. Such a $NO/NO_2$ particle distribution corresponds to a molar ratio of NO to $NO_2$ that ranges from about 4 to about 19. The exhaust flow 16, moreover, can attain temperatures up to about 900° C. The temperature of the exhaust flow 16 produced when the A/F mixture 14 is lean along with the relatively high $O_2$ content and the relatively low reductant content (CO, $H_2$, and HC's) promotes an oxidizing environment in the exhaust flow 16.

During instances when the A/F mixture 14 is rich, however, the amount of CO, HC's and $NO_X$ present in the exhaust flow 16 is typically greater than when the A/F mixture 14 is lean. A very small amount of hydrogen ($H_2$) is also typically present in the exhaust flow 16 while $O_2$ is generally absent. Such a shift in the chemical content of the exhaust flow 16 may be attributable to the incomplete and oxygen-limiting combustion of fuel and the higher temperatures, up to about 1200° C., that are normally achieved in the exhaust flow 16 when the A/F mixture 14 being combusted is rich. The temperature of the exhaust flow 16 produced when the A/F mixture 14 is rich along with the reductant (CO, $H_2$, and HC's) content and the absence of $O_2$ promotes a reducing environment in the exhaust flow 16.

The three-way-catalyst 20 receives the exhaust flow 16 from the engine 12 and is located upstream from the oxidation catalyst 22 and the $NH_3$—SCR catalyst 24. The three-way-catalyst 20 serves several functions in the exhaust aftertreatment system 10 depending on the air to fuel mass ratio of the A/F mixture 14. First, the three-way-catalyst 20 oxidizes CO (to $CO_2$) and HC's (to $CO_2$ and $H_2O$) contained in the exhaust flow 16 when the A/F mixture 14 being supplied to and combusted in the engine 12 is lean. The oxidation of NO by the three-way-catalyst 20 is generally limited under such circumstances and, as such, the NO to $NO_2$ molar ratio of the $NO_R$ in the exhaust flow 16 is generally unaffected. The three-way-catalyst 20 operates in this way a majority of the time since the A/F mixture 14 supplied to the engine 12 is primarily lean. Second, the three-way-catalyst 20 oxidizes CO (to $CO_2$) and HC's (to $CO_2$ and $H_2O$) and simultaneously reduces $NO_X$ (to $N_2$) when the A/F mixture 14 being supplied to and combusted in the engine 12 is rich. The $NO_R$ is also subject to an alternative coupled reaction in which $NO_R$, $H_2$, and CO react the absence of $O_2$ to form $NH_3$ and $CO_2$.

The A/F mixture 14 may be cycled between lean and rich to passively generate $NH_3$ in any appropriate manner. Cycling may be conducted, for example, by introducing the A/F mixture 14 to the engine 12 lean of stoichiometry and then rapidly pulsing bursts of fuel into the A/F mixture 14 as needed. Cycling may also be conducted, as another example, by introducing the A/F mixture 14 to the engine 12 lean of stoichiometry and then continually adding fuel to the A/F mixture 14 for a period of time so that the A/F mixture 14 runs rich for relatively sustained interval before reverting back to lean. Each approach allows the oxidation catalyst 20 passively generate $NH_3$ in controlled amounts to replenish the $NH_3$—SCR catalyst 24 with absorbed $NH_3$. The selectivity for $NH_3$ formation over the three-way-catalyst 20 during cycling of the A/F mixture 14 can be controlled and encouraged by an electronic control strategy or other suitable approach. An electronic control strategy may, for instance, monitor a variety of measurable parameters that are directly and/or indirectly related to the catalytic activity of the three-way-catalyst 20 and, in response to variances in those parameters, adjust as necessary one or more engine operating conditions (air to fuel mass ratio of the A/F mixture 14, spark-ignition timing, EGR valve position, intake and exhaust valve timing and phasing, etc.) to either increase or decrease passive $NH_3$ production. A specific example of an electronic control strategy that may be implemented to control the generation of $NH_3$ over the three-way-catalyst 20 is disclosed in commonly owned U.S. Patent Application Publication 2010/0043402 to Perry et al.

The three-way catalyst 20 may, in one embodiment, comprise a combination of platinum (Pt), palladium (Pd), and rhodium (Rh) impregnated on a high-surface area base metal oxide such as alumina, cerium and zirconium oxide ($CeO_2$—$ZrO_2$), or a zeolite. The Pt/Pd/Rh loading on the base metal oxide may range from about 1 to about 11 g/L. A specific example of the three-way-catalyst 20 that may be used in the exhaust aftertreatment system 10 is commercially available from BASF Catalysts (Iselin, N.J.).

The three-way-catalyst 20 may be washcoated onto a substrate body and housed within a canister that fluidly communicates with the engine 12. The canister may be close-coupled to the engine 12 or piped a short distance away. The substrate body may, for example, be a monolithic honeycomb structure that includes several hundred to several thousand parallel flow-through cells per square inch. Each of the flow-through cells may be defined by a wall surface on which the three-way-catalyst 20 is washcoated. The monolithic honeycomb structure may be formed from a material capable of withstanding the temperatures and chemical environment associated with the exhaust flow 16. Some specific examples of materials that may be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel.

The oxidation catalyst 22 receives the exhaust flow 16 from the three-way-catalyst 20 and helps the $NH_3$—SCR catalyst 24 operate more effectively at low-temperatures, for instance, below about 300° C. and even more so below about 250° C. The oxidation catalyst 22 comprises perovskite oxide particles and, optionally, a base material on which the perovskite oxide particles are dispersed. The combustion of the A/F mixture 14, while lean, usually provides the exhaust flow 16 leaving the three-way-catalyst 20 with a $NO_X$ contingent that comprises a molar ratio of NO to $NO_2$ that lies somewhere between about 4 and about 19. This molar ratio of NO to $NO_2$ may have to be lowered since the $NH_3$—SCR catalyst 24 typically converts $NO_X$ to $N_2$ more effectively when the NO to $NO_2$ molar ratio ranges from about 0.33 to about 1. The oxidation catalyst 22 oxidizes NO to $NO_2$ to achieve such a molar ratio of NO to $NO_2$ in the exhaust flow 16. The relatively strong thermal durability of the perovskite oxide particles, even after significant catalyst ageing, helps maintain the catalytic activity of the oxidation catalyst 22 over time so that a consistent molar ratio of NO to $NO_2$ can be achieved in the $NO_X$ fed to the $NH_3$—SCR catalyst 24. The oxidation catalyst 22, moreover, generally does not interfere with the passage of $NH_3$ from the three-way-catalyst 20 to the $NH_3$—SCR catalyst 24 during the periodic instances when the A/F mixture 14 combusted in the engine 12 is rich. This is because the reducing environment associated with the exhaust flow 16 under such conditions renders the oxidation catalyst 22 practically inactive.

The perovskite oxide particles may be present in the oxidation catalyst 22 from about 50 to about 200 g/L and more specifically from about 100 to about 150 g/L. The specific perovskite oxide particle loading may be chosen, if desired, based on the normal expected operating temperature window of the exhaust flow 16 and the ageing of the oxidation catalyst 22. The oxidation catalyst 22 may, in one embodiment, be carried on a support body housed within a canister that is fluidly coupled with a separate device that houses the three-way-catalyst 20. The canister may be constructed to communicate the exhaust flow 16 exiting the three-way-catalyst 20 across the substrate body to induce intimate exposure between the exhaust flow 16 and the oxidation catalyst 22. Various constructions of the substrate body are possible. The substrate body may be a monolithic honeycomb structure that includes several hundred to several thousand parallel flow-through cells per square inch. Each of the flow-through cells may be defined by a wall surface on which the oxidation catalyst 22 may be washcoated. The monolithic honeycomb structure may be formed from a material capable of withstanding the temperatures and chemical environment associated with the exhaust flow 16. Some specific examples of materials that may be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel.

The perovskite oxide particles included in the oxidation catalyst 22 encompass a class of compounds defined by the general formula $ABO_3$. The "A" and "B" atoms may be complimentary cations of different sizes that coordinate with oxygen anions. A unit cell of the $ABO_3$ crystal structure may feature a cubic closest packing arrangement with the "A" cation, which is generally the larger of the two cations, centrally located and surrounded by eight "B" cations situated in the octahedral voids of the packing arrangement. The "A" and "B" cations in such a packing arrangement respectively coordinate with twelve and six oxygen anions. The unit cell of the $ABO_3$ crystal structure, however, is not necessarily limited to a cubic closest packing arrangement. Certain combinations of the "A" and "B" cations may indeed deviate from the cubic closest packing arrangement and assume, for instance, an orthorhombic, rhombohedral, or monoclinic packing structure. Small amounts of the "A" and/or "B" cations, moreover, may be substituted with different yet similarly sized "A1" and "B1" promoter cations to give a supercell crystal structure derived from the general $ABO_3$ crystal structure and designated by the general formula $A_{1-X}A1_XB_{1-Y}B1_YO_3$, where both X and Y range from 0 to 1.

The perovskite oxide particles may comprise the same perovskite oxide or a mixture of two or more perovskite oxides. A great many combinations of perovskite oxides are available for use in the oxidation catalyst 22 since no fewer than 27 cations may be employed as the "A" cation and no fewer than 36 cations may be employed as the "B" cation. A listing of the cations most frequently employed as the "A" cation includes those of calcium (Ca), strontium (Sr), barium (Ba), bismuth (Bi), cadmium (Cd), cerium (Ce), lead (Pb), yttrium (Y), and lanthanum (La) while a listing of the cations most commonly employed as the "B" cation includes those of cobalt (Co), titanium (Ti), zirconium (Zr), niobium (Nb), tin (Sn), cerium (Ce), aluminum (Al), nickel (Ni), chromium (Cr), manganese (Mn), copper (Cu), and iron (Fe). Some specific and exemplary perovskite oxides that may constitute all or part of the perovskite oxide particles include $LaCoO_3$, $La_{0.9}Sr_{0.1}CoO_3$, $LaMnO_3$, $La_{0.9}Sr_{0.1}MnO_3$, $LaFeO_3$, and $La_{0.9}Sr_{0.1}FeO_3$. Small amounts of palladium particles, for example, ranging from about 0.5 to about 5.0 wt. % based on the weight of the oxidation catalyst 22 may be supported on the perovskite oxide particles, if desired, to enhance the HC oxidation capability of the oxidation catalyst 22 as disclosed in commonly owned U.S. patent application Ser. No. 12/720,158 filed on Mar. 9, 2010 to Kim et al.

The perovskite oxide particles can catalytically oxidize NO to $NO_2$ when exposed to the exhaust flow 16 exiting the three-way-catalyst 20 just as efficiently as a conventional combination of PGM's during periods in which the A/F mixture 14 combusted in the engine 12 is lean. While not wishing to be bound by theory, it is believed that the perovskite oxide particles donate oxygen anions to NO molecules to enable the formation of $NO_2$ while temporarily forming oxygen vacancies in their $ABO_3$ or $A_{1-X}A1_XB_{1-Y}B1_YO_3$ crystal structure. Readily available oxygen contained in the exhaust flow 16 then disassociates to fill those oxygen anion vacancies and possibly oxidize additional NO molecules. The ability of the perovskite oxide particles to efficiently oxidize NO to $NO_2$ may significantly diminish or altogether eliminate the need to position a PGM-based catalyst upstream from the $NH_3$—SCR catalyst 24 to enhance low-temperature $NO_X$ conversion efficiency. The oxidation catalyst 22 may, as a result, provide the exhaust aftertreatment system 10 with a smaller amount of PGM's than a comparable exhaust aftertreatment system that uses a conventional PGM-based oxidation catalyst (platinum and palladium) to oxidize NO to $NO_2$ for the selective catalytic reduction of $NO_X$ with $NH_3$.

The base material, if present, may exhibit a relatively high surface area with many loading or dispersion sites for accommodating the perovskite oxide particles. The surface area of the base material may range, for example, from about 20 $m^2/g$ to about 300 $m^2/g$. The base material may be present in the oxidation catalyst 22 at an amount that ranges from about 50 to about 300 g/L. The loading of the base material, however, may vary beyond those limits depending on the specific composition of the base material, the amount of the perovskite oxide particles present, the particular perovskite oxides particles employed, and whether or not other substances are dispersed on the base material, to name but a few potentially relevant factors. Some materials that may be used to construct the base material include a mixture of cerium and zirconium oxide ($CeO_2$—$ZrO_2$), alumina ($Al_2O_3$), a zeolite, or a combination of one or more of those materials. Any appropriate technique may be used to disperse the perovskite oxide particles onto the base material including washcoating and incipient wet impregnation.

The $NH_3$—SCR catalyst 24 receives the exhaust flow 16 from the oxidation catalyst 22 and converts $NO_X$ to $N_2$ in the presence of $NH_3$ and $O_2$. The $NH_3$—SCR catalyst 24, as previously mentioned, absorbs passively generated $NH_3$ and reduces $NO_X$ with the absorbed $NH_3$ depending on the chemical content of the exhaust flow 16. The absorbed $NH_3$ is tapped and consumed to convert $NO_X$ (both NO and $NO_2$) into $N_2$ when the A/F mixture 14 combusted in the engine 12 is lean and, consequently, the resultant exhaust flow 16 traversing the $NH_3$—SCR catalyst 24 promotes an oxidizing environment. The conversion of $NO_X$ to $N_2$ at temperatures below about 300° C. is aided by the upstream oxidation catalyst's 22 ability to lower the NO to $NO_2$ molar ratio of the $NO_X$ contingent in the exhaust flow 16. But the $NH_3$—SCR catalyst 24 can only convert $NO_X$ in this fashion for so long before the stored $NH_3$ is eventually depleted or reduced to a level where $NO_X$ reduction is difficult. At this time, or at any time deemed appropriate, the A/F mixture 14 may be cycled from lean to rich to replenish the $NH_3$—SCR catalyst 24 with $NH_3$. Such modulation of the A/F mixture 14, as already described, passively generates $NH_3$ over the three-way-catalyst 20 and promotes a reducing environment in the exhaust flow 16 that enables the generated $NH_3$ to move past the oxidation catalyst 22 and to the $NH_3$—SCR catalyst 24 where it is absorbed.

The $NH_3$—SCR catalyst 24 is generally a porous and high-surface area material—a wide variety of which are commercially available. The $NH_3$—SCR catalyst 24 may, in one embodiment, be an ion-exchanged base metal zeolite. Base metals that may be ion-exchanged into the zeolite include, for example, Na, Ba, V, Ti, W, Cu, Fe, or combinations of two or more of those metals. The zeolite may be a β-type zeolite, a Y-type zeolite, a ZM5 zeolite, or any other crystalline zeolite structure such as a Chabazite or a USY (ultra-stable Y-type) zeolite.

The $NH_3$—SCR catalyst 24 may be washcoated onto a substrate body that is housed within a canister that fluidly communicates with the canisters that house the three-way-catalyst 20 and the oxidation catalyst 22. The substrate body may, for example, be a monolithic honeycomb structure that includes several hundred to several thousand parallel flow-through cells per square inch. Each of the flow-through cells may be defined by a wall surface on which the $NH_3$—SCR catalyst 24 is washcoated. The monolithic honeycomb structure may be formed from a material capable of withstanding the temperatures and chemical environment associated with the exhaust flow 16. Some specific examples of materials that may be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel.

The exhaust aftertreatment system 10 operates to remove unwanted gaseous emissions from the exhaust flow 16 and to release a treated exhaust flow 18 that primarily includes $N_2$, $O_2$, $H_2O$, and $CO_2$. The A/F mixture 14 supplied to the engine 12 is kept lean as long as the $NH_3$—SCR catalyst 24 contains enough stored $NH_3$ to convert the NO in the exhaust flow 16 into $N_2$. Under such circumstances, the three-way-catalyst 20 oxidizes CO and HC's, the oxidation catalyst 22 oxidizes NO to $NO_2$, and the $NH_3$—SCR catalyst 24 reduces $NO_R$. The oxidation catalyst 22 may oxidize enough NO so that, in one embodiment, the molar ratio of NO to $NO_2$ in the exhaust flow 16 ranges from about 0.33 to about 1. When it is determined that the $NH_3$—SCR catalyst 24 needs to be replenished with $NH_3$, the A/F mixture 14 may be cycled from lean to rich to deliver the exhaust flow 16 to the three-way-catalyst 20 with excess reductants (CO, HC's, $H_2$) in a reducing environment. At least some of the NO present in the exhaust flow 16 reacts with $H_2$ to form $NH_3$ under such circumstances. The rest of the NO and the CO and HC's are simultaneously converted in the presence of one another into $N_2$, $CO_2$, and $H_2O$. The passively generated $NH_3$ is then carried by the exhaust flow 16 through the oxidation catalyst 22 and to the $NH_3$—SCR catalyst 24 where it is absorbed. Once the $NH_3$ reserves in the $NH_3$—SCR catalyst 24 are built up to an acceptable level, the A/F mixture 14 is cycled back to lean. An electronic control system that can be used to monitor and control the exhaust aftertreatment system 10 to passively generate $NH_3$ efficiently and, when needed, is disclosed in commonly owned U.S. Patent Application Publication 2010/0043402 to Perry et al.

Skilled artisans will appreciate that many modifications and additions can be made to the exhaust aftertreatment system 10. The three-way-catalyst 20, the oxidation catalyst 22, and the $NH_3$—SCR catalyst 24 may, for example, be zone coated onto the same support body and housed in a single canister. The positional relationship of the catalysts 20, 22, 24 may be preserved by washcoating the three-way-catalyst 20 onto the leading end of the support body followed by washcoating the oxidation catalyst 22 in the middle and the $NH_3$—SCR catalyst 24 onto the trailing end relative to the flow direction of the exhaust flow 16. Moreover, as another example, two or more canisters that house the $NH_3$—SCR catalyst 24 may be positioned downstream of the three-way-catalyst 20 and the oxidation catalyst 22 either serially or in parallel with one another to help expand the temperature operating window at which $NO_X$ is reduced to $N_2$ by the exhaust aftertreatment system 10. Many other modifications and additions to the exhaust aftertreatment system 10 will also be apparent to skilled artisans although not specifically mentioned here.

EXAMPLE

This Example demonstrates the catalytic activity of an exemplary degreened oxidation catalyst that was evaluated in a laboratory reactor configured to flow a simulated lean-burn engine exhaust feedstreem. The oxidation catalyst evaluated comprised $La_{0.9}Sr_{0.1}CoO_3$ particles washcoated onto a monolithic honeycomb core sample. While this Example evaluates an exemplary oxidation catalyst that includes only $La_{0.9}Sr_{0.1}CoO_3$ particles (perovskite oxide particles), it is expected that the same general results and data would be achieved by either mixing or completely substituting the $La_{0.9}Sr_{0.1}CoO_3$ particles with other perovskite oxide particles such as, for example, $LaCoO_3$, $LaMnO_3$, $La_{0.9}Sr_{0.1}MnO_3$, $LaFeO_3$, and/or $La_{0.9}Sr_{0.1}FeO_3$ particles.

A citric acid method was used to prepare a quantity of $La_{0.9}Sr_{0.1}CoO_3$ particles. First, appropriate amounts of $La(NO_3)_3 \cdot 6H_2O$, $Co(NO_3)_2 \cdot 6H_2O$, and $Sr(NO_3)_2$ were dissolved in distilled water with citric acid monohydrate. The amount of water used was 46.2 mL per gram of $La(NO_3)_3 \cdot 6H_2O$, and the citric acid was added to the distilled water in a 10 wt. % excess to ensure complete complexation of the metal ions. The solution was set on a stirring and heating plate and stirred for 1 hour at room temperature. The solution was then heated to 80° C. under continuous stirring to slowly evaporate the water until the solution became a viscous gel and started evolving $NO/NO_2$ gases. The resulting spongy material was crushed and calcined at 700° C. for about 5 hours in static air. The temperature was then ramped down at a rate of 10° C. per minute. When the temperature reached just below 300° C., the citrate ions combusted vigorously and caused a large spike in temperature and powder displacement. The powder was thus covered with several layers of $ZrO_2$ balls to prevent such powder displacement yet still allow for gas mobility. The prepared $La_{0.9}Sr_{0.1}CoO_3$ particles were characterized by $N_2$ physisorption for surface area measurements and X-ray diffraction for their bulk structure measurements.

The $La_{0.9}Sr_{0.1}CoO_3$ particles were then ball milled with 6.33 mL of water per gram of the $La_9Sr_{0.1}CoO_3$ particles for 18 hours. Afterwards, the slurry was stirred continuously and 0.33 mL $HNO_3$ (0.1M) per gram of the $La_{0.9}Sr_{0.1}CoO_3$ particles and 5 mL of water per gram of the $La_{0.9}Sr_{0.1}CoO_3$ particles were added. The resulting washcoat solution had a concentration of 0.114 grams of $La_{0.9}Sr_{0.1}CoO_3$ particles per mL. The slurry was washcoated onto the monolithic honeycomb core sample (¾ inch diameter by 1 inch length with a flow-through cell density of 400 per square inch). Next, after washcoating of the $La_{0.9}Sr_{0.1}CoO_3$ particles, the monolithic honeycomb core sample was dried and calcined at 550° C. for 5 hours in static air.

A monolithic honeycomb core sample was also prepared that included a degreened conventional PGM-based oxidation catalyst for comparison purposes. The conventional PGM-based oxidation catalyst was obtained from BASF and comprised about 1.72 g/L of PGM's (1.51 g/L Pt and 0.21 g/L Pd).

Figure 2:
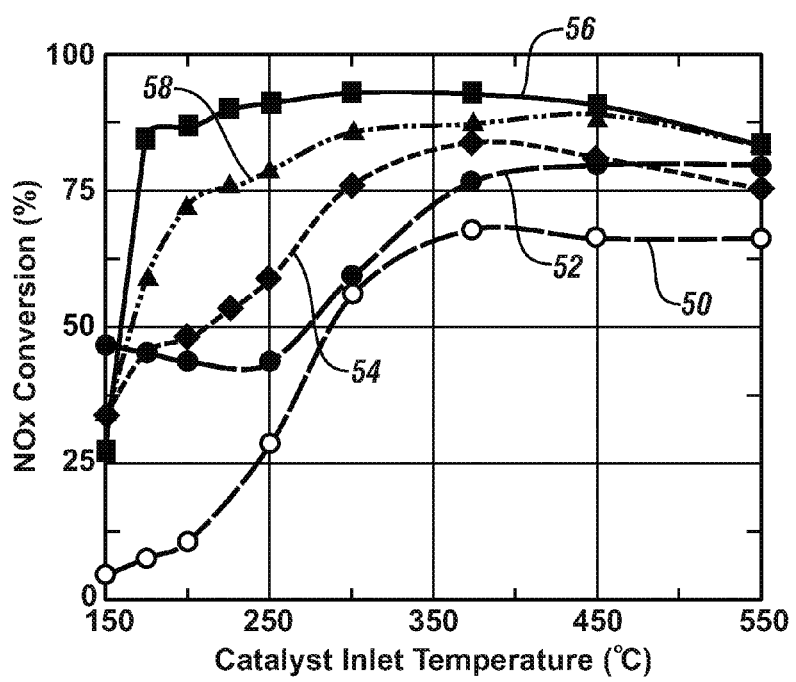
FIG. 2 is a graph that shows the $NO_X$ conversion efficiency of an iron-exchanged zeolite as a function of the molar ratio of NO to $NO_2$ in the $NO_X$ contingent of a simulated lean-burn engine exhaust feedstream fed to the iron-exchanged zeolite.

Before turning to the catalytic activity of the oxidation catalysts, the effect that the NO to $NO_2$ molar feed ratio has on the $NO_X$ conversion efficiency of a conventional iron-exchanged zeolite ($NH_3$—SCR catalyst) are shown in FIG. 2 for illustrative purposes. Temperature (° C.) is plotted on the X-axis and $NO_X$ conversion (%) is plotted on the Y-axis. The $NO_X$ conversion achieved by the iron-exchanged zeolite when the $NO_X$ contained all NO (numeral 50), all $NO_2$ (numeral 52), 25 mol % $NO_2$ (numeral 54), 50 mol % $NO_2$ (numeral 56), and 75 mol % $NO_2$ (numeral 58) are illustrated. As shown, the iron-exchanged zeolite converted $NO_X$ to $N_2$ most effectively, especially at low temperatures (under 250° C.), when the mol % of $NO_2$ present was 50% (NO to $NO_2$ molar ratio of about 1).

Figure 3:
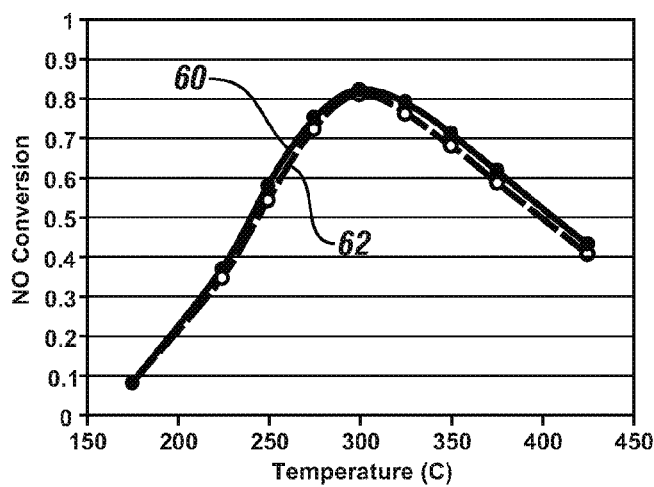
FIG. 3 is a graph that shows the NO oxidation activity of a degreened exemplary oxidation catalyst that includes perovskite oxide particles when exposed to a simulated lean-burn engine exhaust feedstream that includes about 8% $O_2$, about 8% $H_2O$, about 200 ppm NO, and the balance $N_2$.

FIG. 3 shows the NO oxidation performance of the exemplary degreened oxidation catalyst at temperatures ranging from about 150° C. to 450° C. Temperature (° C.) is plotted on the X-axis and NO conversion (%) is plotted on the Y-axis. The simulated exhaust feedstream passed over the oxidation catalyst had a space velocity of about 30,000 $h^{-1}$ and comprised about 8% $O_2$, about 8% $H_2O$, about 200 ppm NO, and the balance $N_2$. The overall conversion of NO is identified as numeral 60 and the conversion of NO to $NO_2$ is identified as numeral 62. As can be seen, the oxidation catalyst converts NO to $NO_2$ quite actively and with a high $NO_2$ selectivity between about 250° C. and 400° C.

Figure 4:
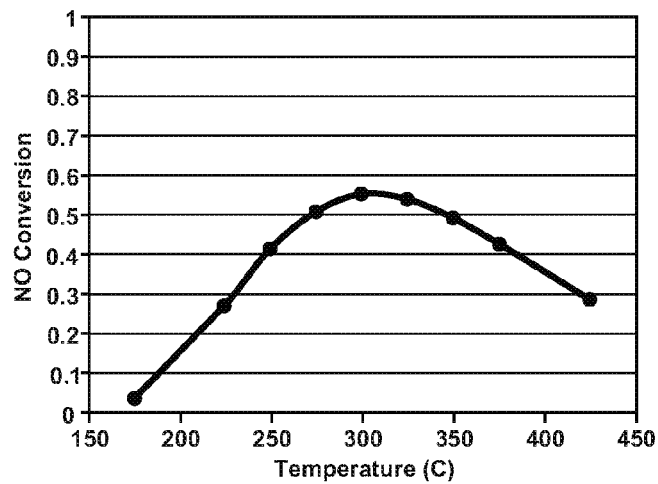
FIG. 4 is a graph that shows the NO oxidation activity of a degreened exemplary oxidation catalyst that includes perovskite oxide particles when exposed to a simulated lean-burn engine exhaust feedstream that includes about 8% $O_2$, about 8% $H_2O$, about 200 ppm NO, about 1000 ppm HC's, and the balance $N_2$.
Figure 5:
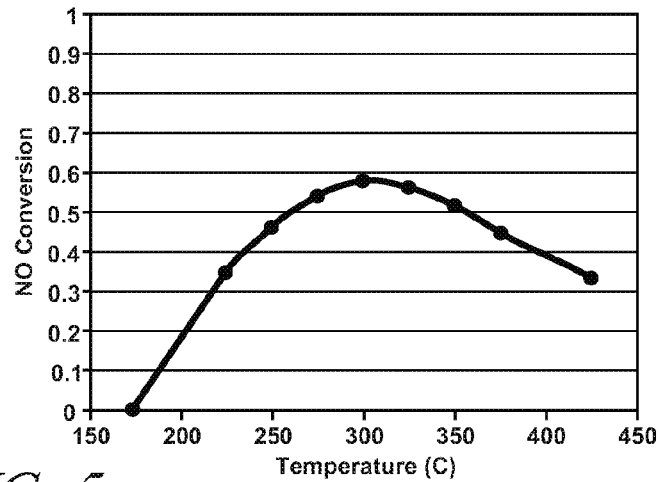
FIG. 5 is a graph that shows the NO oxidation activity of a degreened conventional PGM-based oxidation catalyst when exposed to a simulated lean-burn engine exhaust feedstream that includes about 8% $O_2$, about 8% $H_2O$, about 200 ppm NO, about 1000 ppm HC's, and the balance $N_2$.

FIGS. 4 and 5 compare the NO oxidation performance of the exemplary degreened oxidation catalyst and the degreened conventional PGM-based oxidation catalyst, respectively. Temperature (° C.) is plotted on the X-axis and NO conversion (%) is plotted on the Y-axis. The simulated exhaust feedstream passed over each of the oxidation catalyst and the conventional PGM-based oxidation catalyst had a space velocity of about 30,000 h$^{-1}$ and comprised about 8% $O_2$, about 8% $H_2O$, about 200 ppm NO, about 1000 ppm HC's, and the balance $N_2$. As shown, the oxidation catalyst and the conventional PGM-based oxidation catalyst oxidized NO quite comparably in the presence of HC's over the entire temperature range evaluated.

The above description of embodiments is merely exemplary in nature and, thus, variations thereof are not to be regarded as a departure from the spirit and scope of the invention.

What is claimed is:

1. An exhaust aftertreatment system for removing gaseous emissions contained in an exhaust flow produced by a lean-burn that is supplied with and combusts an A/F mixture, the exhaust aftertreatment system comprising:
   a three-way-catalyst;
   an oxidation catalyst positioned downstream of the three-way-catalyst, the oxidation catalyst comprising perovskite oxide particles in an amount that ranges from about 50 g/L to about 200 g/L; and
   an ammonia-selective catalytic reduction ($NH_3$—SCR) catalyst positioned downstream of the oxidation catalyst, the $NH_3$—SCR catalyst being able to absorb $NH_3$ when the A/F mixture is rich of stoichiometry and reduce $NO_X$ to $N_2$ when the A/F mixture is lean of stoichiometry.

2. The exhaust aftertreatment system set forth in claim 1, wherein the oxidation catalyst comprises perovskite oxide particles that comprise at least one of $LaCoO_3$, $La_{0.9}Sr_{0.1}CoO_3$, $LaMnO_3$, $La_{0.9}Sr_{0.1}MnO_3$, $LaFeO_3$, or $La_{0.9}Sr_{0.1}FeO_3$.

3. The exhaust aftertreatment system set forth in claim 1, wherein the amount of perovskite oxide particles ranges from about 100 g/L to about 150 g/L.

4. The exhaust aftertreatment system set forth in claim 1, wherein the oxidation catalyst does not include any platinum group metals.

5. The exhaust aftertreatment system set forth in claim 1, wherein the three-way-catalyst comprises a combination of platinum, palladium, and rhodium.

6. The exhaust aftertreatment system set forth in claim 1, wherein the $NH_3$—SCR catalyst comprises an ion-exchanged base-metal zeolite that is ion-exchanged with at least one of Na, Ba, V, Ti, W, Cu, Fe, or combinations thereof.

7. The exhaust aftertreatment system set forth in claim 1, wherein the oxidation catalyst further comprises a base material on which the perovskite oxide particles are washcoated.

8. The exhaust aftertreatment system set forth in claim 7, wherein the base material comprises at least one of a zeolite, a mixture of cerium oxide and zirconium oxide, or alumina.

9. A method comprising:
   providing a lean-burn spark-ignition engine that is supplied with and combusts a mixture of air and fuel (A/F mixture) to produce an exhaust flow that comprises carbon monoxide (CO), unburned and/or partially burned hydrocarbons (HC's), and nitrogen oxides ($NO_X$), the $NO_X$ comprising NO and $NO_2$ in a molar ratio;
   delivering the exhaust flow to an exhaust aftertreatment system that comprises a three-way-catalyst, an oxidation catalyst positioned downstream of the three-way-catalyst, and a ammonia-selective catalytic reduction ($NH_3$—SCR) catalyst positioned downstream of the oxidation catalyst, the oxidation catalyst comprising perovskite oxide particles in an amount that ranges from about 50 g/L to about 200 g/L, and the $NH_3$—SCR catalyst being able to absorb $NH_3$ when the exhaust flow promotes a reducing environment and reduce $NO_X$ to $N_2$ in the presence of $NH_3$ absorbed by the $NH_3$—SCR catalyst when the exhaust flow promotes an oxidizing environment;
   supplying the A/F mixture to the lean-burn spark-ignition engine lean of stoichiometry to promote the oxidizing environment in the exhaust flow and to oxidize CO and HC's over the three-way-catalyst, oxidize NO to $NO_2$ over the oxidation catalyst, and reduce $NO_X$ to $N_2$ over the $NH_3$—SCR catalyst when the $NH_3$—SCR catalyst comprises absorbed $NH_3$; and
   cycling the A/F mixture from lean to rich to promote the reducing environment in the exhaust flow and to passively generate $NH_3$ over the three-way-catalyst and communicate the $NH_3$ across the oxidation catalyst and to the $NH_3$—SCR catalyst for absorption by the $NH_3$—SCR catalyst.

10. The method set forth in claim 9, wherein the oxidation catalyst comprises perovskite oxides particles that comprise at least one of $LaCoO_3$, $La_{0.9}Sr_{0.1}CoO_3$, $LaMnO_3$, $La_{0.9}Sr_{0.1}MnO_3$, $LaFeO_3$, or $La_{0.9}Sr_{0.1}FeO_3$.

11. The method set forth in claim 9, wherein the amount of perovskite oxide particles ranges from about 100 g/L to about 150 g/L.

12. The method set forth in claim 9, wherein the three-way-catalyst comprises a combination of platinum, palladium, and rhodium, and wherein the $NH_3$—SCR catalyst comprises an ion-exchanged base-metal zeolite that is ion-exchanged with at least one of Na, Ba, V, Ti, W, Cu, Fe, or combinations thereof.

13. The method set forth in claim 9, wherein the oxidation catalyst oxidizes NO to $NO_2$ so that the molar ratio of NO to $NO_2$ in the exhaust flow delivered to the $NH_3$—SCR catalyst is between about 0.33 and 1 when the A/F mixture supplied to the lean-burn spark-ignition engine is lean of stoichiometry.

14. The method set forth in claim 9, wherein the oxidation catalyst further comprises a base material on which the perovskite oxide particles are washcoated, the base material comprising at least one of a zeolite, a mixture of cerium oxide and zirconium oxide, or alumina.

15. A method comprising:
   supplying a mixture of air and fuel (A/F mixture) that is lean of stoichiometry to a lean-burn spark-ignition engine;
   combusting the A/F mixture that is lean of stoichiometry in the lean-burn spark-ignition engine to produce a first exhaust flow that promotes an oxidizing environment, the first exhaust flow comprising carbon monoxide (CO), unburned and/or partially burned hydrocarbons (HC's), and nitrogen oxides ($NO_X$), the $NO_X$ comprising NO and $NO_2$ in a molar ratio greater than about 4;
   delivering the first exhaust flow to a three-way-catalyst to oxidize CO and HC's;
   delivering the first exhaust flow to an oxidation catalyst that comprises perovskite oxide particles to oxidize NO to $NO_2$ and decrease the molar ratio of NO to $NO_2$ to a range of about 0.33 to about 1, the oxidation catalyst being positioned downstream of the three-way-catalyst;
   delivering the first exhaust flow to an ammonia-selective catalytic reduction ($NH_3$—SCR) catalyst to reduce $NO_X$ to $N_2$, the $NH_3$—SCR catalyst comprising an amount of absorbed $NH_3$ that reduces $NO_X$ to $N_2$ in the oxidizing environment of the first exhaust flow, the $NH_3$—SCR catalyst being positioned downstream of the oxidation catalyst; and replenishing the amount of absorbed $NH_3$ in the $NH_3$—SCR catalyst by cycling the A/F mixture from lean of stoichiometry to rich of stoichiometry to produce a second exhaust flow that promotes a reducing environment and delivering the second exhaust flow to the three-way-catalyst to passively generate $NH_3$ for absorption by the $NH_3$—SCR catalyst.

16. The method set forth in claim 15, wherein the oxidation catalyst comprises perovskites oxides particles that comprise at least one of $LaCoO_3$, $La_{0.9}Sr_{0.1}CoO_3$, $LaMnO_3$, $La_{0.9}Sr_{0.1}MnO_3$, $LaFeO_3$, or $La_{0.9}Sr_{0.1}FeO_3$.

17. The method set forth in claim 15, wherein the amount of perovskite oxide particles in the oxidation catalyst ranges from about 50 g/L to about 200 g/L.

18. The method set forth in claim 15, wherein the three-way-catalyst comprises a combination of platinum, palladium, and rhodium, and wherein the $NH_3$—SCR catalyst comprises an ion-exchanged base-metal zeolite that is ion-exchanged with at least one of Na, Ba, V, Ti, W, Cu, Fe, or combinations thereof.

19. The method set forth in claim 15, wherein the oxidation catalyst further comprises a base material on which the perovskite oxide particles are washcoated, the base material comprising at least one of a zeolite, a mixture of cerium oxide and zirconium oxide, or alumina.

20. The method set forth in claim 15, wherein the oxidation catalyst does not include any platinum group metals.

21. An exhaust aftertreatment system for removing gaseous emissions contained in an exhaust flow produced by a lean-burn that is supplied with and combusts an A/F mixture, the exhaust aftertreatment system comprising:
a three-way-catalyst;
an oxidation catalyst positioned downstream of the three-way-catalyst, the oxidation catalyst comprising perovskite oxide particles in an amount that ranges from about 50 g/L to about 200 g/L with the proviso that the oxidation catalyst does not include aluminium; and
an ammonia-selective catalytic reduction ($NH_3$—SCR) catalyst positioned downstream of the oxidation catalyst, the $NH_3$—SCR catalyst being able to absorb $NH_3$ when the A/F mixture is rich of stoichiometry and reduce $NO_X$ to $N_2$ when the A/F mixture is lean of stoichiometry.

22. A method comprising:
providing a lean-burn spark-ignition engine that is supplied with and combusts a mixture of aft and fuel (A/F mixture) to produce an exhaust flow that comprises carbon monoxide (CO), unburned and/or partially burned hydrocarbons (HC's), and nitrogen oxides ($NO_X$), the $NO_X$ comprising NO and $NO_2$ in a molar ratio;
delivering the exhaust flow to an exhaust aftertreatment system that comprises a three-way-catalyst, an oxidation catalyst positioned downstream of the three-way-catalyst, and a ammonia-selective catalytic reduction ($NH_3$—SCR) catalyst positioned downstream of the oxidation catalyst, the oxidation catalyst comprising perovskite oxide particles in an amount that ranges from about 50 gl to about 200 g/L with the proviso that the oxidation catalyst does not include aluminium, and the $NH_3$—SCR catalyst being able to absorb $NH_3$ when the exhaust flow promotes a reducing environment and reduce $NO_X$ to $N_2$ in the presence of $NH_3$ absorbed by the $NH_3$—SCR catalyst when the exhaust flow promotes an oxidizing environment;
supplying the ALF mixture to the lean-burn spark-ignition engine lean of stoichiometry to promote the oxidizing environment in the exhaust flow and to oxidize CO and HC's over the three-way-catalyst, oxidize NO to $NO_2$ over the oxidation catalyst, and reduce $NO_X$ to $N_2$ over the $NH_3$—SCR catalyst when the $NH_3$—SCR catalyst comprises absorbed $NH_3$; and
cycling the A/F mixture from lean to rich to promote the reducing environment in the exhaust flow and to passively generate $NH_3$ over the three-way-catalyst and communicate the $NH_3$ across the oxidation catalyst and to the $NH_3$—SCR catalyst for absorption by the $NH_3$—SCR catalyst.

23. A method comprising:
supplying a mixture of air and fuel (A/F mixture) that is lean of stoichiometry to a lean-burn spark-ignition engine;
combusting the A/F mixture that is lean of stoichiometry in the lean-burn spark-ignition engine to produce a first exhaust flow that promotes an oxidizing environment, the first exhaust flow comprising carbon monoxide (CO), unburned and/or partially burned hydrocarbons (HC's), and nitrogen oxides ($NO_X$), the $NO_X$ comprising NO and $NO_2$ in a molar ratio greater than about 4;
delivering the first exhaust flow to a three-way-catalyst to oxidize CO and HC's;
delivering the first exhaust flow to an oxidation catalyst that comprises perovskite oxide particles to oxidize NO to $NO_2$ and decrease the molar ratio of NO to $NO_2$ to a range of about 0.33 to about 1, the oxidation catalyst being positioned downstream of the three-way-catalyst with the proviso that the oxidation catalyst does not include aluminium;
delivering the first exhaust flow to an ammonia-selective catalytic reduction ($NH_3$—SCR) catalyst to reduce $NO_X$ to $N_2$, the $NH_3$—SCR catalyst comprising an amount of absorbed $NH_3$ that reduces $NO_X$ to $N_2$ in the oxidizing environment of the first exhaust flow, the $NH_3$—SCR catalyst being positioned downstream of the oxidation catalyst; and
replenishing the amount of absorbed $NH_3$ in the $NH_3$—SCR catalyst by cycling the A/F mixture from lean of stoichiometry to rich of stoichiometry to produce a second exhaust flow that promotes a reducing environment and delivering the second exhaust flow to the three-way-catalyst to passively generate $NH_3$ for absorption by the $NH_3$—SCR catalyst.

24. The exhaust aftertreatment system set forth in claim 1, wherein the three-way-catalyst is washcoated onto a substrate with a monolithic honeycomb structure.

25. The exhaust aftertreatment system set forth in claim 24, wherein the substrate comprises at least one of extruded cordierite, α-alumina, silicon carbide, silicon nitride, zirconia, muilite, spodumene, alumina-silica-magnesia, zirconium silicate, sillimanite, petalite, titanium, or stainless steel.

* * * * *